United States Patent [19]

Hüttlin

[11] 4,159,131

[45] Jun. 26, 1979

[54] HOSE COUPLING

[76] Inventor: Herbert Hüttlin, Lörracher Str. 14, 7853 Steinen, Fed. Rep. of Germany

[21] Appl. No.: 844,934

[22] Filed: Oct. 25, 1977

[30] Foreign Application Priority Data

Oct. 29, 1976 [DE] Fed. Rep. of Germany ....... 2649796

[51] Int. Cl.² ............................................. F16L 35/00
[52] U.S. Cl. ....................................... 285/24; 285/70; 285/313; 285/317; 285/320
[58] Field of Search ....................... 285/18, 24, 27, 65, 285/66, 67, 68, 69, 70, 185, 191, 307, 308, 317, 320, 313; 403/322, 328

[56] References Cited

U.S. PATENT DOCUMENTS

| | | | |
|---|---|---|---|
| 1,642,728 | 9/1927 | Glen | 285/65 X |
| 2,460,352 | 2/1949 | Jensen | 285/308 X |
| 2,868,563 | 1/1959 | Wood | 285/70 |
| 3,653,693 | 4/1972 | Wieland | 285/317 |

FOREIGN PATENT DOCUMENTS 13179 of 1912 United Kingdom ..................... 285/317

Primary Examiner—Dave W. Arola
Attorney, Agent, or Firm—Karl W. Flocks

[57] ABSTRACT

A hose coupling with an annular frame member fastened to a hose end for locking to a second hose end with a crosspiece fixed transversely in the frame member and a pin projecting out parallel to the center axis and having transverse holes therein including a hole in its projecting position. The crosspiece has an opening to receive a like pin from a second hose coupling, and a latch in a locking position engaging transverse holes in the pin from the second hose coupling and a transverse hole in the pin from the first mentioned hose coupling.

10 Claims, 3 Drawing Figures

HOSE COUPLING

BACKGROUND OF THE INVENTION

1. Field of the Invention

This invention relates to a hose coupling having a central axis and an annular frame member in, particular of a nominal width from 100 mm. upwards, adapted for fastening to a hose end and for locking with a second identical hose coupling.

2. Prior Art

In known hose couplings of this kind the frame member comprises radially outwardly directed flange sections which are offset angularly relative to one another and radially inwardly directed flange sections disposed between them and having a hook-shaped profile. Upon putting such hose couplings together axially they must be twisted so as to become interlocked. This twisting takes place at increasing frictional resistance and, at large diameters, consequently requires quite a considerable torque which can hardly be applied without a tool. Much less still can the separation of such known couplings be accomplished without a tool.

SUMMARY OF THIS INVENTION

It is an object of this invention to improve a hose coupling of the kind specified such that it can be coupled easily and quickly with another hose coupling of the same kind without the use of a tool and that also the separation of such hose couplings requires only little force.

According to this invention in a hose coupling as set forth a crosspiece is fixed in said frame member and carries a pin projecting from said frame member parallel to said central axis and being provided with a transverse hole in its projecting portion, said crosspiece further comprising an opening parallel to said axis adapted to receive a corresponding pin of said second hose coupling, said crosspiece further guiding a latch which is operable through a lateral hole in said frame member, said latch having a locking position in which it engages in a transverse hole of a pin belonging to said second hose coupling and a release position in which it releases said pin of said second hose coupling.

Hose couplings in accordance with this invention are easy to manipulate. They only need to be pushed together in axial direction until said latch of each hose coupling can enter into said transverse hole in the pin of the respective second hose coupling. As soon as that is accomplished, the pins can transmit considerable tension. Sealing means may be provided at the frame members. They need not be of great mechanical strength since no relative rotation under load takes place upon assembling or separating the hose couplings. Therefore, the choice of the seals may be determined predominantly by the chemical and physical properties of the medium to be sealed.

Said crosspiece or traverse preferably is a tube in which said latch is arranged. This design is favorable from the point of view of flow dynamics and largely protects the latch from becoming dirty.

Preferably, the opening in parallel with said central axis of the coupling is constituted by part of the interior of a sleeve which is fixed to said crosspiece, coaxially with said frame member, and in which the respective pin is secured.

This embodiment is easy to manufacture and particularly robust if said sleeve is designed to have a circular inner cross section and said pins of said first and second coupling members each have a semicircular cross section of corresponding diameter.

The locking is especially stable if said sleeve has a transverse hole in which the respective latch is guided.

Said transverse hole preferably extends diametrically across the sleeve and through said pin which is fastened in said sleeve. This makes it possible for the corresponding latch in locking position to pass through both pins of the assembled hose couplings so as to provide a particularly firm connection.

Said latch preferably is frustoconical in that area in which it cooperates with said pin belonging to said second hose coupling.

It is preferred for said latch to be biased in the direction of its locking position.

The latter feature preferably is further developed such that said latch has a shoulder to be engaged from behind by a nose of a pawl when said latch is in release position. Said pawl is biased toward said latch and, when the frame members of two hose couplings are pressed together, it adopts a position in which it releases said latch. This embodiment further provides for the latch to have a manipulator or handle operable from outside through said lateral hole in said frame member and movable against said bias until said nose snaps into engagement.

As a further development of the latter feature a manipulator may be guided at said crosspiece diametrically opposite said latch and biased away from the latch. This manipulator can be pushed, against its bias, through said transverse hole in said pin of said second hose coupling by applying pressure on a diaphragm inserted laterally in said frame member.

BRIEF DESCRIPTION OF THE PREFERRED EMBODIMENTS

In the Drawings, each of which is an axial sectional elevation:

AS SHOWN ON THE DRAWINGS

Figure 1:
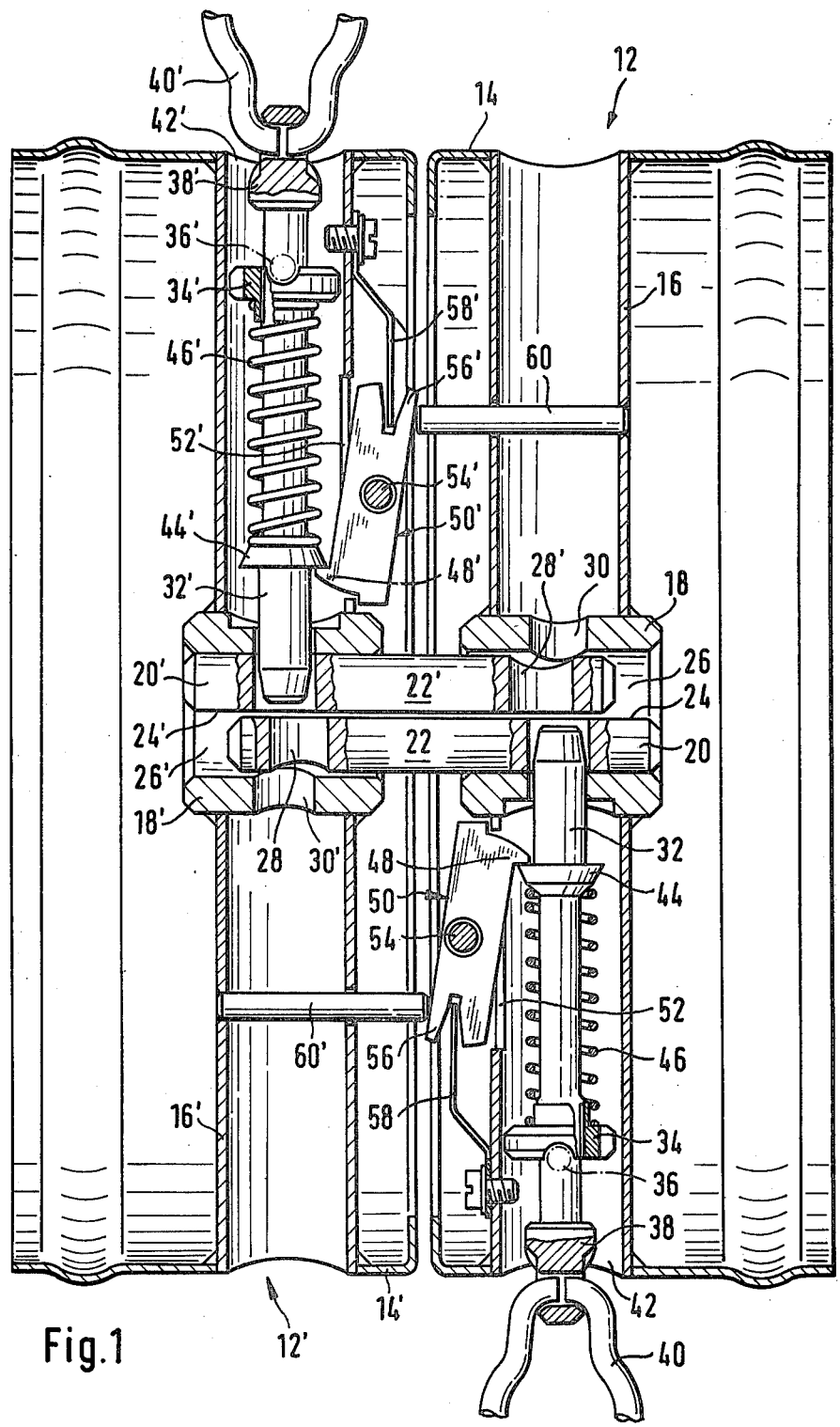
FIG. 1 shows two hose couplings during assembly.
Figure 2:
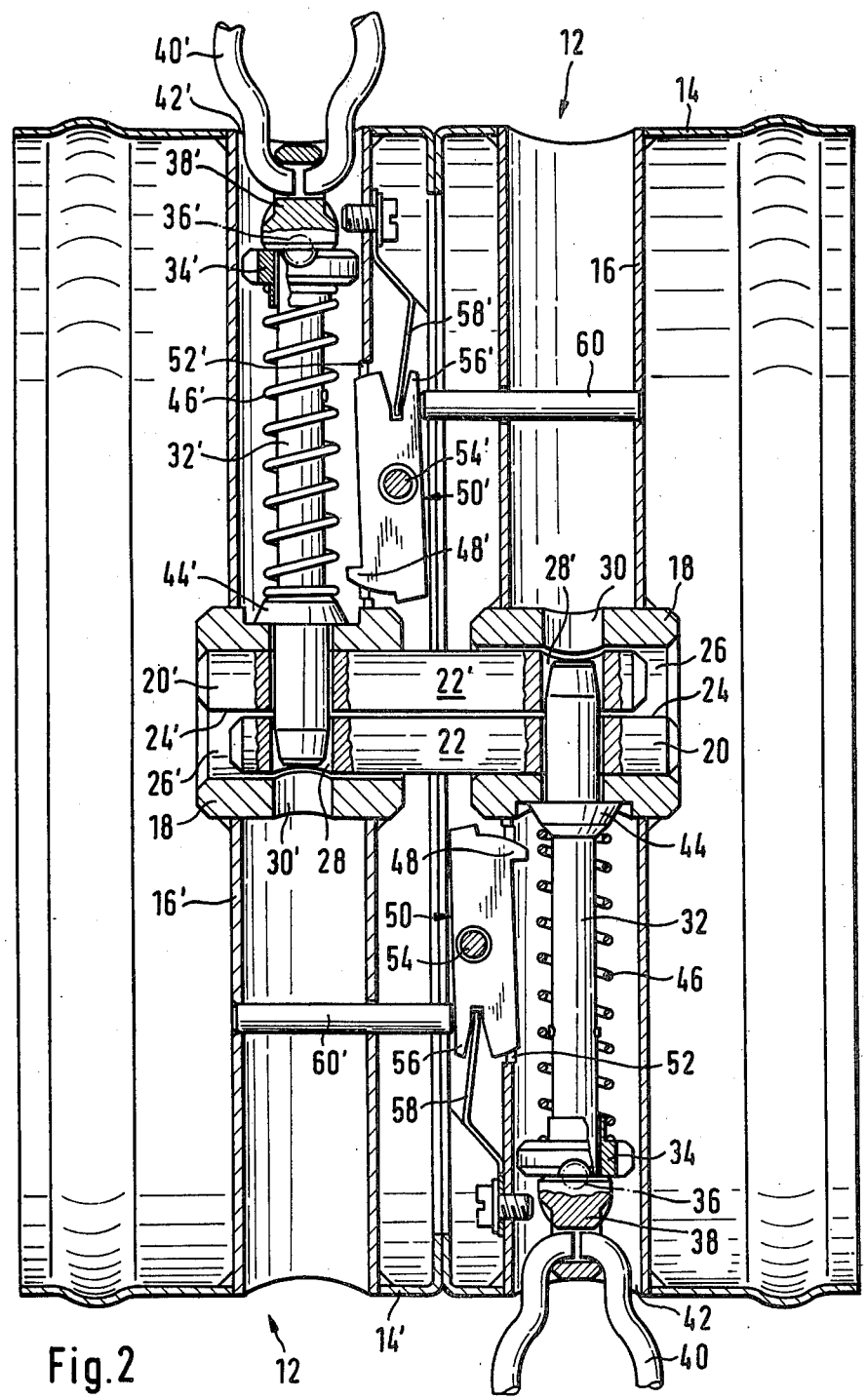
FIG. 2 shows the two hose couplings according to FIG. 1 in assembled state.

The two hose couplings 12 and 12' shown in FIGS. 1 and 2 are identical. For this reason their individual elements are designated by the same reference numberals, those of the left hand hose coupling 12' being provided with a prime for better illustration of the interengagement of the individual elements of the two hose couplings.

Hose coupling 12 comprises an annular frame member 14 of sheet metal, to the right end of which a hose can be attached, for example by means of a hose clip. A tubular crosspiece 16 is welded diametrically into the frame member 14. Crosspiece 16 is interrupted in the middle where it carries a cylindrical sleeve 18 of circular cross section which is welded to the crosspiece and arranged coaxially with frame member 14. A pin 20 extending parallel to the central axis of frame member 14 is welded into sleeve 18. About half of the length of pin 20 projects from frame member 14 and has a semicircular cross section inside as well as outside of sleeve 18 so that it comprises a semicylindrical surface 22 and a plane surface 24. The plane surface 24 extends diametrically through the interior of sleeve 18. Pin 20 consequently fills half of the interior of sleeve 18 and leaves the other half free which thus forms an opening 26 parallel to said axis.

Close to the end of its part projecting from sleeve 18 the pin 20 is provided with a transverse hole 28 which ist of circular cylindrical shape in the embodiment shwon. Also sleeve 18 has a transverse hole 30 in its central area. In the embodiment shown this transverse hole is also of circular cylindrical shape and it also extends through pin 20. A radially arranged latch 32 is guided for radial displacement in the transverse hole 30 of sleeve 18. In addition latch 32 is guided in a guide ring 34 which is centered in the tubular crosspiece 16 and supported on short radial bolts 36 which are fixed to the crosspiece 16 at opposed locations. Latch 32 is frustoconical at its end facing pin 20 and, at its other end, it has a head 38 which can be touched by a finger in the embodiment shown in FIGS. 1 and 2 through a lateral hole 42 in frame member 14 by grasping a handle or manipulator 40 supported on head 38. A shoulder 44 is integrally formed with or secured to latch 32 spaced toward the interior from guide ring 34. A helical spring 46 is placed under tension between shoulder 44 and guide ring 34 so as to always urge latch 32 radially inwards. When latch 32 is in its release position shown in FIG. 1 a nose 48 on a pawl 50 counteracts this tendency. Pawl 50 is supported on a pivot pin 54 fixed to the crosspiece for pivoting movement within a slot 52 of crosspiece 16. Its end 56 remote from nose 48 is dovetailed. A leaf spring 58 fixed to crosspiece 16 engages in the dovetailed end 56 and attempts to hold pawl 50 in the position shown in FIG. 1 at which nose 48 engages behind shoulder 44.

A stud 60 is fixed to crosspiece 16 at that part which is located opposite latch 32. It extends parallel to the common axis of edge 14 and sleeve 18 and projects somewhat beyond edge 14. In the position shown in FIG. 1 at which the two hose couplings 12 and 12' are positioned opposite each other and pins 20 and 20' have already partly entered into sleeves 18' and 18 of the respective other hose coupling the stud 60 of the right hose coupling 12 lies in the same plane as pawl 50' of the left hose coupling 12'. As both hose couplings are identical the corresponding stud 60' of the left hose coupling 12' at the same time lies in the same plane as pawl 50 of the right hose coupling 12.

If both hose couplings 12 and 12' are pushed together in axial direction according to FIG. 2 until the edges 14 abut each other, stud 60' presses against end 56 of pawl 50 and pivots the pawl such that its nose 48 releases shoulder 44. The same happens with pawl 50'. Consequently latch 32 moves radially inwardly under the pressure of helical spring 46 so that it engages in the transverse hole 28' of pin 20', while at the same time latch 3240 engages in transverse hole 28 of pin 20. Thus the two hose couplings 12 and 12' are firmly locked, and all the user had to do was to push the two hose couplings together axially.

If the hose couplings 12 and 12' are to be separated again, the two angular manipulators 40 and 40' are pulled outwardly either together or one after the other so that latches 32 and 32' return into their release positions shown in FIG. 1 where they are held automatically by the corresponding pawl 50 and 50', respectively. All that remains to be done subsequently is to pull apart the two hose couplings 12 and 12' in axial direction.

Figure 3:
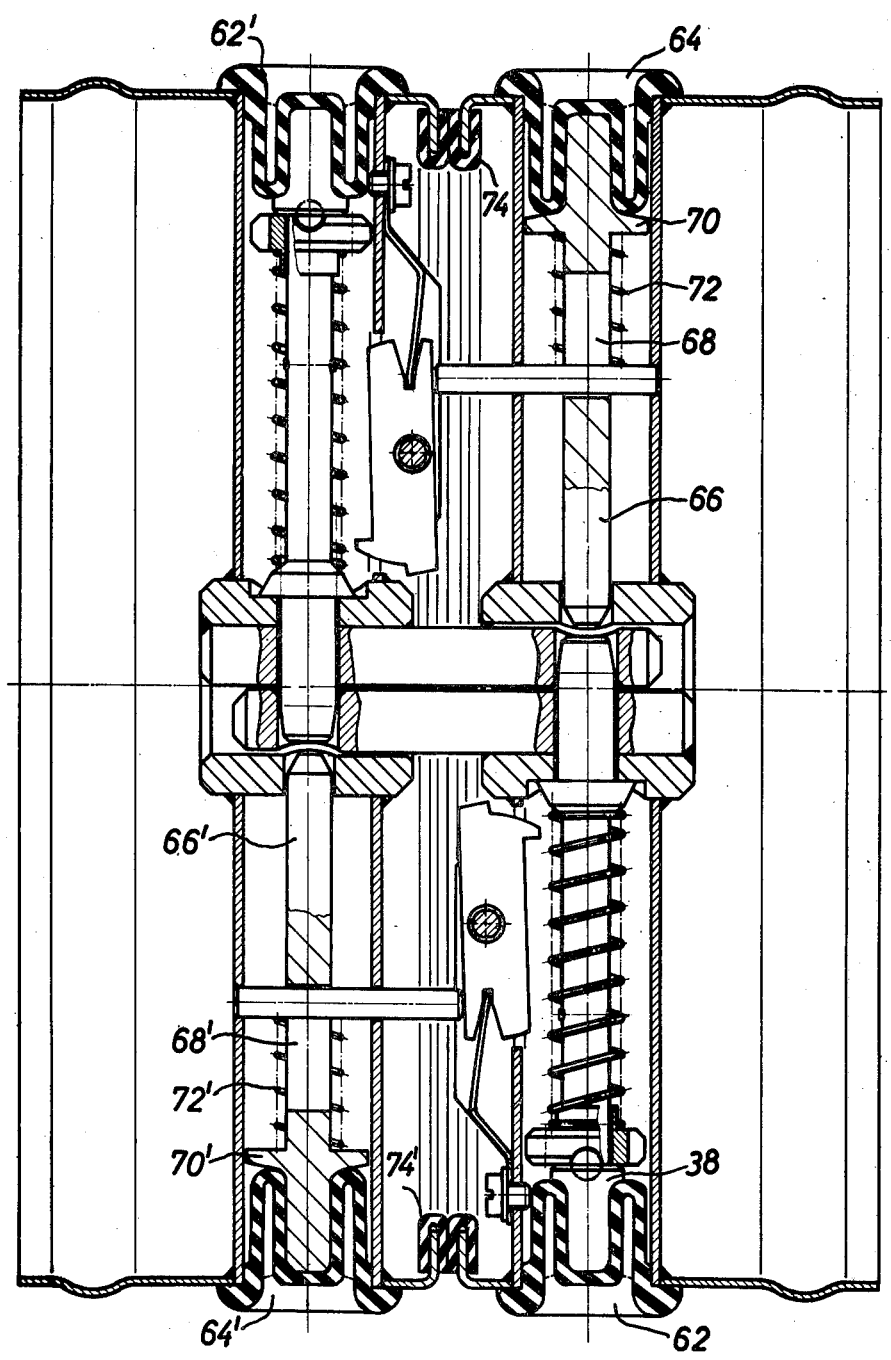
FIG. 3 shows two modified hose couplings in assembled state.

The two hose couplings shown in FIG. 3 are identical and also in agreement with the hose couplings according to FIGS. 1 and 2 in most of their details. To the extent that there is agreement between the embodiments the same reference numerals are used as in FIGS. 1 and 2. The differences will be described below with reference to the right hose coupling 13 shown in FIG. 3.

A diaphragm each 62 and 64, respectively, is secured in both outer ends of tubular crosspiece 16. Instead of the angular manipulator 40 a plunger-like manipulator 66 is provided which is not connected with latch 32 but instead disposed diametrically opposite the same in crosspiece 16. This manipulator is guided for displacement independently of latch 32 in transverse hole 30 of sleeve 18. In addition manipulator 66 is guided at stud 60 which extends through a slot 68 in the manipulator and at the same time limits its movement in longitudinal direction of crosspiece 16. A helical spring 72 is placed under tension between pin 60 and a collar 70 which is either formed integrally with manipulator 66 or secured to the same. The spring always attempts to hold manipulator 66 in its inoperative position shown in FIG. 3.

The same applies mutatis mutandis to hose coupling 12' shown on the left side of FIG. 3. Here too the reference numerals of the individual elements are provided with a prime. If the two hose couplings 12 and 12' are to be separated from each other, diaphragms 64 and 64' are pressed down either simultaneously or successively so as to press manipulators 66 and 66' inwardly until they displace the corresponding latches 32 and 32' out of transverse holes 28' and 28 of pins 20 and 20' of the respective other hose coupling 12' or 12 and permit the noses 48 and 48' of pawls 50 and 50' to engage behind the shoulders 44 and 44' of the respective latch 32 or 32', respectively. When diaphragms 64 and 64' are released, the manipulators 66 and 66' return into their inoperative positions under the pressure of the corresponding helical spring 72 or 72', respectively. Now hose couplings 12 and 12' can be pulled apart.

A supplement which can be provided with both embodiments of the hose coupling but is shown only in FIG. 3 consists in annular seals 74 and 74' fixed to edges 14 and 14', respectively. In the embodiment shown the annular seals 74 and 74' have a U-shaped cross sectional outline open toward the outside. Yet they may also have other cross sectional shapes adapted in each individual case to the design of frame members 14 and 14' as well as to the given opportunities of fixing.

The hose couplings shown in FIGS. 1 and 2 are particularly suitable for quick-installation suction lines with which it makes no difference if small amounts of infiltrated air are sucked in additionally, for instance, when exhausting gases which have been set free because of an accident in a chemical production plant. The embodiment shown in FIG. 3 is furthermore suitable for pressure lines because it is completely sealed by virtue of diaphragms 62 and 64 and annular seal 74.

It will be understood that while the invention has been shown and described in a preferred form, changes may be made without departing from the scope of the invention as defined in the following claims.

What is claimed is:

1. A hose coupling having a central axis and comprising an annular frame member, in particular of a nominal width from 100 mm. upwards, adapted for fastening to a hose end and for locking with a second identical hose coupling, wherein a crosspiece is fixed in said frame member against movement relative to said frame member and carries a pin projecting out from said frame member opposite from said frame member's connection to a hose end and parallel to said central axis and being provided with a transverse hole in its projecting portion, said crosspiece further comprising an opening parallel to said axis adapted to receive a corresponding pin of the second hose coupling, said crosspiece further guiding a latch which is operable through a lateral hole in said frame member, means to move said latch between a locking position in which it engages in a transverse hole of a pin belonging to said second hose coupling to lock said second hose coupling against movement relative to said frame member of said first mentioned hose coupling and a position in which said latch releases said pin of said second hose coupling.

2. A hose coupling as claimed in claim 1, wherein said crosspiece is a tube in which said latch is arranged for sliding movement between said locking position and said release position.

3. A hose coupling as claimed in claim 1, wherein said opening parallel to said central axis is constituted by part of the interior of a sleeve which is fixed to said crosspiece coaxially with the corresponding frame member and in which the respective pin is fastened.

4. A hose coupling as claimed in claim 3, wherein said sleeve has a circular inner cross section and said pins each have a semicircular cross section of corresponding diameter.

5. A hose coupling as claimed in claim 3, wherein said sleeve has a transverse hole in which said corresponding latch is guided.

6. A hose coupling as claimed in claim 5, wherein said transverse hole extends diametrically through said sleeve and said pin fastened in the same.

7. A hose coupling as claimed in claim 1, wherein said latch is frustoconical in that area in which it cooperates with said pin belonging to said second hose coupling.

8. A hose coupling as claimed in claim 1, wherein said latch is spring biased in the direction of its locking position.

9. A hose coupling as claimed in claim 8, wherein said latch comprises a shoulder which is engaged, with the latch in release position, by a nose of a pawl biased toward said latch and, when said frame members of said first and second hose couplings are pressed together, said second hose coupling has means thereon which urges said pawl of said first hose coupling into a position in which it disengages said latch, and wherein said latch comprises a manipulator which is operable from outside through said lateral hole in said frame member and by means of which said latch is movable against said bias until said nose snaps into engagement with said shoulder.

10. A hose coupling as claimed in claim 9, wherein a manipulator spring biased away from said latch is guided at said crosspiece at a location diametrically opposite said latch and is adapted to be pushed against said bias through said transverse hole of said pin belonging to said second hose coupling by exerting pressure on a diaphragm inserted laterally in said crosspiece.

* * * * *